United States Patent [19]

Lundin

[11] 4,349,439
[45] Sep. 14, 1982

[54] APPARATUS FOR COLLECTING OIL OR SIMILAR SUBSTANCES FROM THE SURFACE OF WATER

[76] Inventor: Lars I. Lundin, Kauppiaankatu 4, SF-06150, Porvoo 15, Finland

[21] Appl. No.: 257,871

[22] Filed: Apr. 27, 1981

[51] Int. Cl.³ ............................................. E02B 15/04
[52] U.S. Cl. .................................. 210/242.3; 210/923
[58] Field of Search ....................... 210/242.3, 923, 924

[56] References Cited

U.S. PATENT DOCUMENTS

| | | | |
|---|---|---|---|
| 3,744,638 | 7/1973 | Rhodes | 210/242.3 |
| 3,990,975 | 11/1976 | McLellan | 210/242.3 |
| 4,052,313 | 10/1977 | Rolls | 210/242.3 |
| 4,146,477 | 3/1979 | Challener | 210/242.3 |

*Primary Examiner*—John Adee
*Attorney, Agent, or Firm*—Jay L. Chaskin

[57] ABSTRACT

Disclosed is an apparatus for collecting oil or similar substances from the water surface. The apparatus comprises a floating rope being held in a loop shape and adopted to collect oil contaminated therewith. The apparatus is conventionally provided with a cleaning device removing oil from the rope and with means for pulling the rope past said cleaning device. In order to improve collection capacity of the rope, the invention provides means connected to the rope for rotating the same around the longitudinal axis thereof. Said means can be positioned e.g. at the end of one of two booms or similar holding the rope in the loop shape. The cleaning device may be positioned in the middle so that two loops are formed, one on each side of the cleaning device, and the pulling means may then be adopted to pull the rope alternatingly in opposite directions through the cleaning device.

9 Claims, 5 Drawing Figures

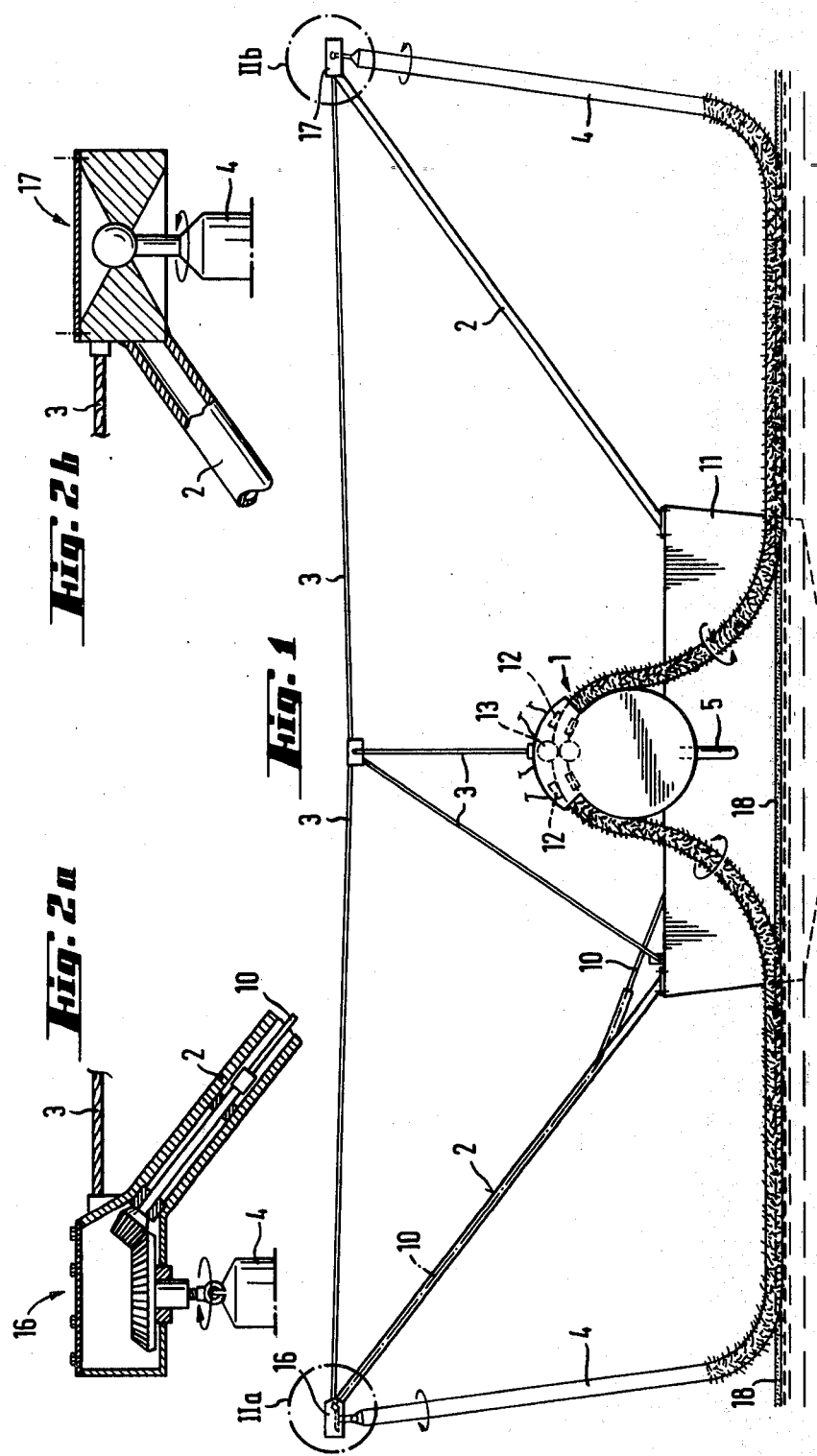

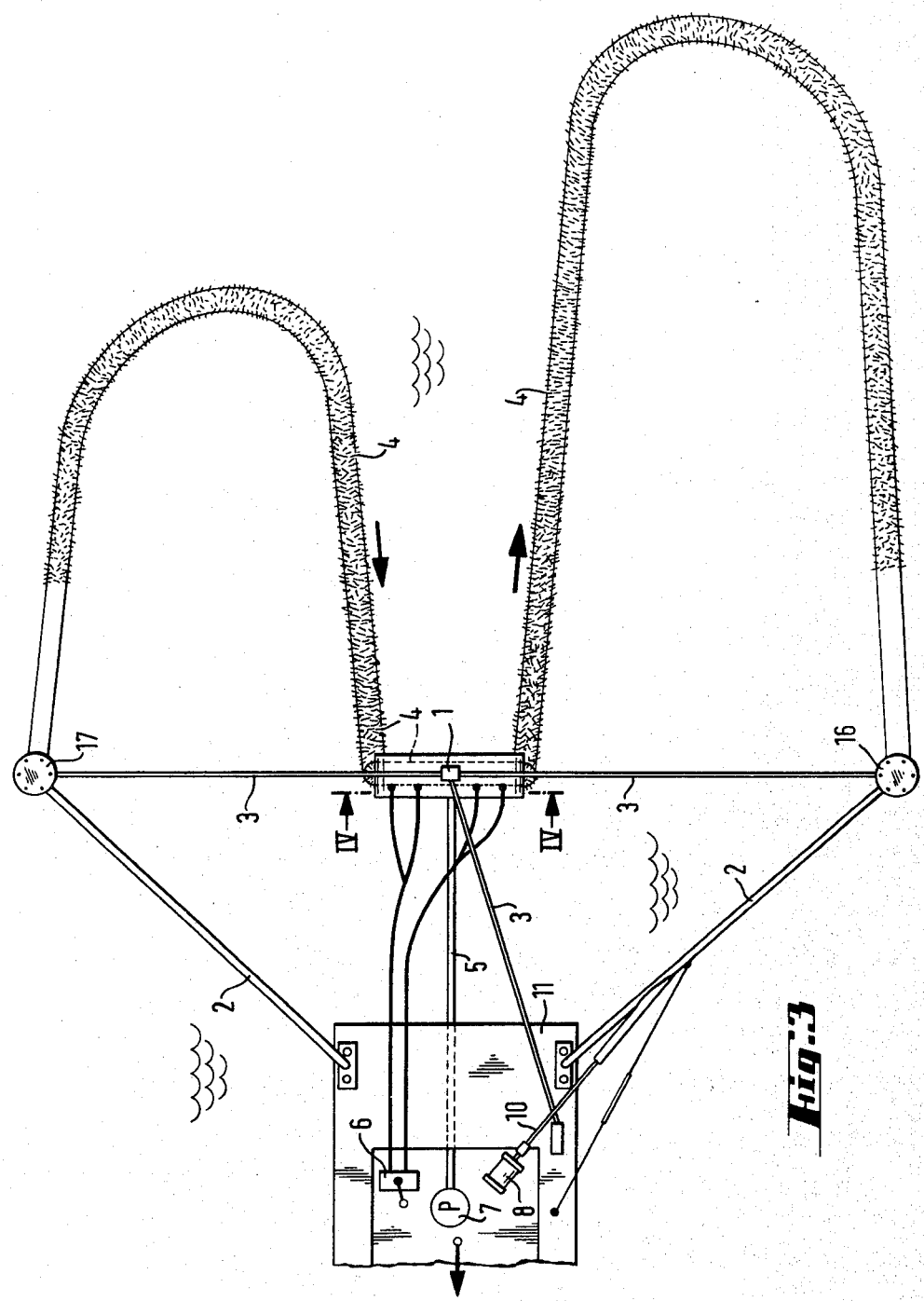

APPARATUS FOR COLLECTING OIL OR SIMILAR SUBSTANCES FROM THE SURFACE OF WATER

BACKGROUND OF THE INVENTION

1. Field of the Invention

The present invention relates to an apparatus by means of which oil or other similar impurity can be removed from the surface of water by collecting it in a rope or similar means and by then removing it from the rope. The apparatus is especially suitable if the substance to be removed is heavy fuel oil or crude oil from which some of the light fractions have evaporated. It can be said that by the time the apparatus has been brought to the collection place, the oil has already evaporated to such a degree that it is suitable for being collected by means of an apparatus according to the present invention.

2. Description of the Prior Art

A large number of oil removal devices are known in the field. Many of them are also based on the use of a rope or similar means, the rope being moved back and forth through the collecting device, or the collecting device being moved along the rope. The known apparatus have, however, a disadvantage in that, when they are used, all the collecting material cannot be exploited to the maximum degree. This is so because, being in the form of a circular boom, the collecting material must float on water, in which case oil is collecting only by that part of the material which happens to be at the water surface level at a given time. Waves alter the level to some extent, but at least a half of the effective collecting capacity of the material may remain unused.

SUMMARY OF THE INVENTION

The invention provides an apparatus which comprises an elongated member in the form of a rope having a specific weight less than that of water and being adopted to collect the substance to be collected; a pair of booms engaging the rope at two positions apart from each other so as to hold the rope in a loop on the water surface; a cleaning device for removing substance collecting by the rope; means for pulling the rope through said cleaning device; and means for rotating the rope about its longitudinal axis.

The object of the present invention is to eliminate the disadvantages of the current state of the art and to provide an apparatus by means of which the total collecting capacity of the collecting material can be exploited. Furthermore, this can be achieved at substantially the same cost as a conventional apparatus.

BRIEF DESCRIPTION OF THE DRAWINGS

FIG. 1 depicts an apparatus according to the invention as seen from behind the apparatus in the travel direction of the vessel which is moving it, FIGS. 2a and 2b depicts details of the same apparatus, FIG. 3 depicts the apparatus as seen vertically from above.

DESCRIPTION OF THE PREFERRED EMBODIMENTS

Figure 4:
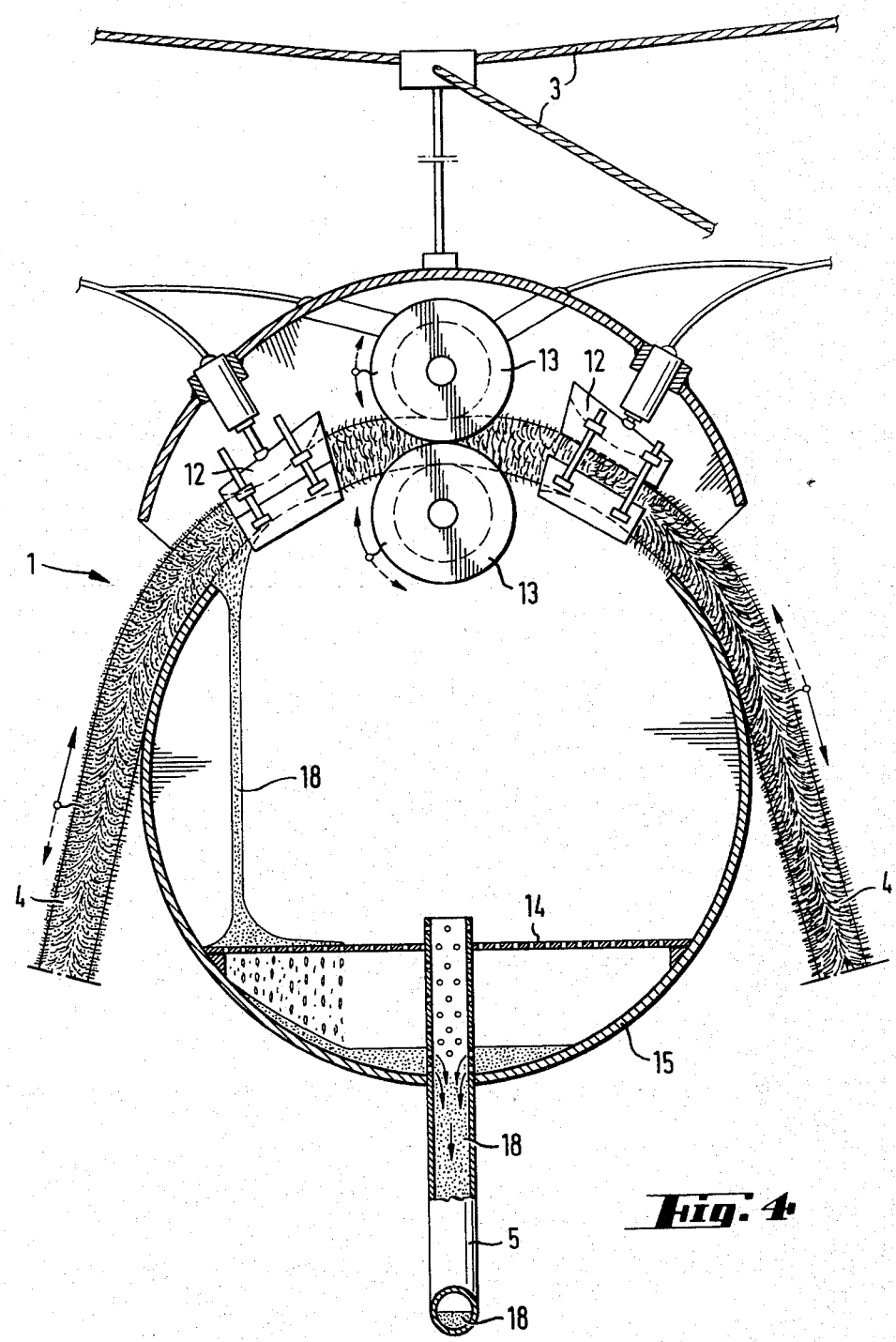
FIG. 4 depicts one principle of a cleaning and moving device, by way of example.

The collecting device 1 is suspended from bars 2 attached to the back of a boat in such a manner that the collecting device is suspended, for example by cables 3, quite close to the water surface. The length of the bars 2 and their placement height can be selected so as to be suitably variable or at least adjustable to different positions. The collecting rope 4 passes through the collecting device 1 and, having passed through it and having been cleaned, the rope is again ready for collecting oil 18 or a similar impurity. Since both ends of the rope are attached to the bars, it is evident that a collecting device located somewhere between the bars divides the rope into two loops, which alternately lengthen and shorten. From the collecting device 1 the collected oil can be directed, for example by means of a suitable pipe 5, to the vessel supporting the apparatus.

FIGS. 2a and 2b depicts details of the same apparatus, the details illustrating how the rope is suspended at the ends of the bars 2. Since the rope is rotatable, it is expedient to place the rotating member at the end of one bar 2. In FIG. 2, the rotating member is located at the end of the bar indicated by 16. As can be seen from the figure, the rotation is in this specific case effected by means of conical gear wheels. The drive mechanism of the wheels can, for its part, be any conventional drive mechanism, such as en electric motor or hydraulic motor, etc. The other end of the collecting rope 4, for its part, is attached to the end of the other bar in such a manner that it is free to rotate as the drive mechanism at the other end rotates it. The freely rotating end of the rope 4 is indicated by reference numeral 17 (FIG. 2b).

In FIG. 3 the apparatus according to the invention is depicted as seen vertically from above. The collecting device 1 is located approximately half-way between the bars 2, supported by cable 3, as was explained in connection with FIG. 1. In order for the apparatus to be controllable from the boat 11, there must be control leads or, for example, hydraulic hoses, from the boat to the device which is to be controlled at a given time. Therefore, there is in the boat, for example a device 6 for controlling the sweeping members 12 (FIG. 4) working in the collecting device 1 in such a manner that, depending on the desired travel direction of the rope, the sweeping members are always closed on that side of the rope 4 which is located in front of the drive wheels 13, which are also controlled by means of the same device 6. The said functions are preferably hydraulic. The devices in the boat 11 also include a pump 7 by means of which oil is sucked up from the collecting device. The third device in the boat 11 is a device 8 for controlling the rotational speed of the rope; by means of this device the rotation of the drive cable 10 is either accelerated or decelerated, depending on the amount of the oil to be collected, for example.

FIG. 4 shows, by way of example, an embodiment of the collecting device 1, even though any conventional device is suitable for this purpose. The sweepers 12 are two-parted, the parts being capable of being brought towards each other in such a manner that they adapt substantially tightly to the surface of the collecting rope 4 and sweep the oil 18 off it. Excessive pressure is to be avoided in order not to damage the rope. The oil flows from the sweeper to the bottom of a spherical or cylindrical container 15 through a grill 14, and it can be removed from the bottom of the container by means of, for example, a pump 7 situated in the boat. The grill is preferably detachable so that it can be removed for cleaning. It should be noted that only that sweeper which is on the leading side of the rope at a given time is working. Another essential part of the collecting device consists of the drive wheels 13, which move the rope in the desired direction at the desired speed. The operations of the drive wheels 13 and the sweepers 12 are preferably linked to each other in such a manner that a change in the rotational direction of the drive wheels 13 causes an automatic change-over from one sweeper to the other, which means that the sweeper on the leading side of the rope is always working.

As regards the rotational speed of the drive wheels 13, it is varied according to need. It is clear that the aim is to collect in the rope 4 as much oil or other similar impurity as can be held in it without difficulty. Thus the rotational speed is high when there is a large amount of oil to be collected, and when there is little oil the rope can be driven at a slower speed, in which case it can collect oil from a larger area.

The collecting rope used in connection with the apparatus according to the invention can be of any known type. Both the surface material and the reinforcement cable can be of any material suitable for the purpose. It should also be noted that ropes of different materials and different structures must be used according to the floating capacity of the rope and the substance to be collected.

Various modifications in structure and/or function can be made by one skilled in the art to the disclosed embodiments without departing from the scope of invention as defined by the claims.

What is claimed is:

1. An apparatus for collecting oil and similar substances from the surface of water, the apparatus comprising an elongated member in the form of a rope having a specific weight less than that of water and being adopted to collect the substance to be collected:

a pair of booms engaging the rope at two positions apart from each other so as to hold the rope in a loop on the water surface;
a cleaning device for removing substance collected by the rope;
means for pulling the rope through the cleaning device; and
rotation means connected to at least one given end of the rope for rotating the rope about its longitudinal axis.

2. An apparatus according to claim 1, wherein the rotating means is located at the end of at least one of said booms.

3. An apparatus according to claim 1 or 2, wherein the rotating means is hydraulically driven.

4. An apparatus according to claim 1, wherein the cleaning device is positioned essentially in the middle between said booms so that one loop of the rope is created on each side of the cleaning device, pulling means being arranged on each side of the cleaning device so as to pull the rope alternately in opposite directions through the cleaning device.

5. An apparatus according to claim 1 wherein the rotating means comprises gear means and drive means for driving the gear means.

6. An apparatus according to claim 5 wherein the drive means is is a cable connected between the gear means and a power source.

7. An apparatus according to claim 5 wherein the drive means is disposed substantially within one of the pair of booms.

8. An apparatus according to claim 1 wherein an end of the rope other than the given end of the rope is free to rotate in response to the rotation means.

9. An apparatus according to claim 1 wherein the rotation means includes means for controlling the rotational speed of the rope.

* * * * *